United States Patent Office 3,524,860
Patented Aug. 18, 1970

1

3,524,860
(2-IMIDAZOLIN-2-YL)ALKYL-SUBSTITUTED 7-AZAINDOLES
Noel F. Albertson, East Greenbush, N.Y., assignor to Sterling Drug Inc., New York, N.Y., a corporation of Delaware
No Drawing. Continuation-in-part of application Ser. No. 697,620, Jan. 15, 1968, which is a continuation-in-part of application Ser. No. 529,207, Feb. 23, 1966. This application July 18, 1969, Ser. No. 843,212
Claims priority, application Great Britain, Feb. 2, 1967, 5,200/67
Int. Cl. C07d *31/42*
U.S. Cl. 260—296      24 Claims

ABSTRACT OF THE DISCLOSURE

A series of (2-imidazolin-2-yl)alkyl-substituted 7-azaindoles possessing vasoconstrictor activity are useful as topical agents for shrinking mucosal tissue. The compounds of the series are prepared by interaction of the appropriate cyanoalkyl-substituted 7-azaindole and an ethylene diamine in the presence of a small amount of carbon disulfide.

---

This application is a continuation-in-part of my prior copending application Ser. No. 697,620, filed Jan. 15, 1968, now abandoned, which in turn is a continuation-in-part of my prior copending application Ser. No. 529,207, filed Feb. 23, 1966, now abandoned.

This invention relates to compositions of matter classified in the art of chemistry as substituted 7-azaindoles and to a process for preparing the same.

The compounds of the present invention have the general formula:

FORMULA I

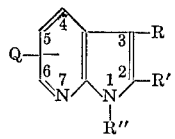

in which either one or two of R, R' or R" is (2-imidazolin-2-yl)-lower-alkyl and the other of R, R' or R" when not (2-imidazolin-2-yl)-lower-alkyl, is hydrogen, lower-alkyl, phenyl or phenyl-lower-alkyl; wherein the imidazolinyl group is unsubstituted or substituted by from one to five lower-alkyl groups, and phenyl, both occurrences, is unsubstituted or substituted by from one to three groups selected from the group consisting of lower-alkyl, lower-alkoxy, halogen, lower-alkylmercapto or trifluoromethyl; and Q stands for hydrogen or from one to three substituents attached to a ring carbon selected from the group consisting of lower-alkyl, lower-alkoxy and lower-alkylmercapto.

More specifically, the compounds of my invention in the free base form have the formulas:

2

FORMULA Ia

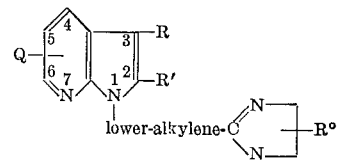

and

FORMULA Ib

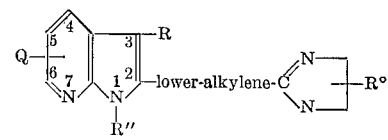

and

FORMULA Ic

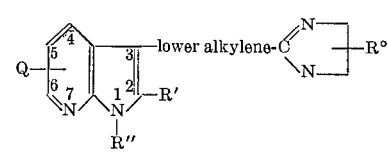

wherein R, R', R" and Q have the meanings given above, and R° stands for hydrogen or from one to five lower-alkyl groups.

In the above formulas, when R, R', R" R° or Q are lower-alkyl, there are included straight- or branched-chain alkyls having from one to six carbon atoms, and thus including for example methyl, ethyl, n-propyl, isopropyl, n-butyl, isobutyl, n-amyl, n-hexyl and the like. The lower-alkyl groups having from four to six carbon atoms are preferably primary or secondary alkyl.

The term "phenyl-lower-alkyl" as used herein means a monovalent radical consisting of the phenyl nucleus bonded to the rest of the molecule through a divalent lower-alkylene radical having one to four carbon atoms as exemplified by, but not limited to, methylene, 1,1-ethylene, 1,2-ethylene, 1,3-propylene, 1,2-propylene, 1,4-butylene, and the like. Thus, solely for illustration and without limitation, examples of phenyl-lower-alkyl are benzyl, 1-phenylethyl, 2-phenylethyl, 3-phenylpropyl, 4-phenylbutyl, and the like.

The benzene ring of "phenyl" and "phenyl-lower-alkyl" can bear from one to three lower-alkyl, lower-alkoxy, halogen, lower-alkylmercapto or trifluoromethyl groups which, if more than one, can be the same or different. Among such substituted-benzene rings are, without limiting the generality of the foregoing, lower-alkylphenyl, e.g., 2-methylphenyl, 3-ethylphenyl, 4-isopropylphenyl, 3,4,5-trimethylphenyl or any other analogous lower-alkylphenyl radical; halophenyl, e.g., 4-fluorophenyl, 3-chlorophenyl, 2-bromophenyl, 4-iodophenyl, 3,4-dichlorophenyl or any other analogous halophenyl radical; lower-alkoxyphenyl, e.g., 2-methoxyphenyl, 3-ethoxyphenyl, 4-butoxyphenyl, 3,4,5-trimethoxyphenyl or any other analogous lower-alkoxyphenyl radical; 4 - trifluoromethylphenyl; lower-alkylmercaptophenyl, e.g., 3-methylmercaptophenyl, 4-butylmercaptophenyl or any other analogous lower-alkylmercaptophenyl radical; or substituted phenyl with different substituents, e.g., 3-methyl-4-chlorophenyl, 2-bromo-4-methoxyphenyl, 3 - methoxy-4-chloro-5-methylphenyl, and the like.

As used throughout, the terms lower-alkoxy and lower-alkylmercapto refer to such groups having from one to six carbon atoms which can be straight or branched.

Lower-alkylene as used in Formulas Ia, Ib, Ic, IIa, IIb, and IIc herein means bivalent saturated aliphatic hydrocarbon radicals containing 1 to 3 carbon atoms wherein the two free valence bonds are attached to the same or different carbon atoms. Thus, lower-alkylene includes straight- or branched-chains, for example, methylene, 1,2-ethylene, ethylidene, ethylidene, 1,3-propylene, 1,2-propylene, 2,3-propylene, isopropylidene and the like.

The compounds of my invention have been found to possess vasoconstrictor activity when tested by a standard pharmacological procedure, viz. the rabbit aortic strip test of Furchgott. (For details of this procedure, see: R. F. Furchgott and S. Bhadrakom, "Reaction of Strips of Rabbit Aorta to Epinephrine, Isopropylarterenol, Sodium Nitrite and Other Drugs," Journal of Pharmacology and Experimental Therapeutics, Vol. 108: 129, 1953; and R. F. Furchgott, "Spiral-cut Strip of Rabbit Aorta for In Vitro Studies of Responses of Arterial Smooth Muscle," Methods in Medical Research, vol. 8: 177–186, 1960.) This test is an art-recognized qualitative and quantitative procedure for determining vasoconstrictor activity of various drugs. The compounds of my invention, were tested by this method using as a reference standard, a known (2-imidazolin-2-yl)alkyl vasoconstricting drug, viz. naphazoline hydrochloride [2 - (1-naphthylmethyl)imidazoline hydrochloride]. Thus, aqueous solutions containing from $10^{-8}$ to $10^{-5}$ g./ml. of the acid-addition salts of the compounds of my invention were found to have from 5 to 100 percent of the vasoconstrictor activity compared with naphazoline hydrochloride tested by the same procedure and at the same concentration. The preferred compound of my invention, 2-methyl-3-(2-imidazolin-2-ylmethyl)-7-azaindole p-toluenesulfonate has vasoconstrictor activity equal to that of naphazoline hydrochloride when tested at the same concentrations.

Because of their vasoconstrictor properties determined as described hereinabove, the compounds of this invention are useful for the same application as naphazoline, viz. as agents for topical nasal decongestion in mammalian subjects. Accordingly, I contemplate that the best mode for using my invention is through the application of aqueous solutions of the physiologically-acceptable acid-addition salts of the compounds of my invention to the nasal mucosa. Intranasal medication with the solutions may be accomplished by any of the accepted methods for such medication, for example, drops, spray, irrigation and such. Of course, the amount and duration of nasal decongestion desired are factors that determine the best concentration in any particular instance. However, for general use, I prefer to employ the aqueous solutions of my compounds in concentrations of from 0.05 to 0.5 percent. The compounds can be prepared for use by dissolving under sterile conditions, a salt form of the compounds in water (or an equivalent amount of a non-toxic acid if the free base is used), or in a physiologically compatible aqueous medium such as saline. Still further the compounds can be formulated for intranasal administration in aqueous alcohol, glycol, oil-water emulsions or other conventional pharmaceutical excipients.

In accordance with the process of this invention, my new (2-imidazolin-2-yl)-lower-alkyl-7-azaindoles are obtained by reacting a cyano-lower-alkyl-7-azaindole having the formula:

FORMULA II

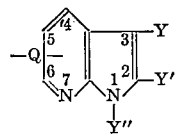

wherein either one or two of Y, Y' or Y'' is cyano-lower-alkyl and the other of Y, Y' or Y'' when not cyano-lower-alkyl is hydrogen, lower-alkyl, phenyl or phenyl-lower-alkyl, and Q has the meaning given hereinabove, with a diamine of the formula:

FORMULA III

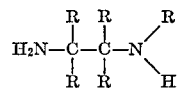

wherein the R's are the same or different and are hydrogen or lower-alkyl, in the presence of a small amount of carbon disulfide. The carbon disulfide or its sulfur-containing products participate in the reaction, but as these sulfur-containing products are regenerated, less than a stoichiometric amount is required.

When representing lower-alkyl in Formula III, R includes straight- or branched-chain alkyls having one to three carbon atoms, for example methyl, ethyl, n-propyl, isopropyl and the like.

More specifically, the intermediate cyano-lower-alkyl-7-azaindoles have the formulas:

FORMULA IIa

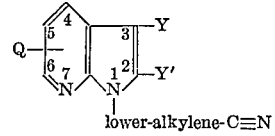

and

FORMULA IIb

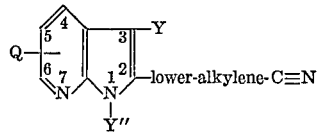

and

FORMULA IIc

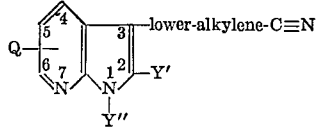

in which Y, Y', Y'' and Q have the meanings given above.

In the above formulas for the cyano-lower-alkyl-7-azaindoles when Y, Y' and Y'' are lower-alkyl, there are included straight- or branched-chain alkyls having one to six carbon atoms and thus including, for example methyl, ethyl, n-propyl, isopropyl, n-butyl, isobutyl, n-amyl, n-hexyl and the like.

Alternatively, the new (2-imidazolin-2-yl)-lower-alkyl-7-azaindoles of my invention can be obtained by first reacting the appropriate cyano-lower-alkyl-7-azaindole of Formula II with a lower-alkanol, for example ethyl alcohol, solution of hydrochloric acid to yield a lower-alkyl (7-azaindolyl)-alkanimidate hydrochloride salt. This product is then reacted with a diamine of Formula III to produce the desired (2-imidazolin-2-yl)-lower-alkyl-7-azaindole.

The intermediate cyano-lower-alkyl-7-azaindoles of Formula II can be prepared by a number of methods. One method involves the direct alkylation of an azaindole nucleus using an appropriate halo-alkanenitrile. The alkylation can take place either on the 1-nitrogen atom bearing a replaceable hydrogen atom, or it can take place on a carbon atom bearing an activated hydrogen atom. The former is illustrated by the preparation of a 1-(cyanoalkyl)-7-azaindole which is produced when a 7-azaindole (or a substituted 7-azaindole) is reacted with a halo-alkanenitrile in the presence of an acid-acceptor.

Another method for the preparation of the cyano-lower-alkyl-7-azaindoles of Formula II comprises reacting acrylonitrile with a 7-azaindole compound having an activated hydrogen atom attached either to a carbon atom or to the 1-nitrogen atom. The former reaction usually takes place spontaneously on mixing of the aromatic compound with the acrylonitrile but in the latter case, it is generally necessary to employ a strong base as a catalyst, for example, potassium t-butoxide, sodium hydride, organo ammonium hydroxides, and the like.

Still another method for the preparation of the cyano-lower-alkyl-azaindoles of Formula II comprises metathetical replacement of a tertiary amino group of a Mannich base with cyanide ion. This method is illustrated by the preparation of 3-cyanomethyl-7-azaindole from 3-dimethylaminomethyl-7-azaindole. The reaction is generally carried out in an aqueous medium at the reflux temperature using equimolar amounts of an alkali metal cyanide and a mineral acid. A preferred reaction medium is aqueous dimethylformamide.

In some cases it is desirable to introduce the cyano-lower-alkyl side chain through the formation of the aromatic ring to which it is attached. For example, a cyanomethyl group is introduced at the 2-position of the 7-azaindole nucleus by the following method: 3-methyl-2-nitropyridine is reacted with ethyl oxalate, the resultant ethyl (2-nitro-3-pyridyl)pyruvate is hydrolyzed to produce the corresponding free acid, which by reductive ring closure is converted to 7-azaindole-2-carboxylic acid; this acid is converted to the acid chloride, which is reacted with dimethylamine to produce N,N-dimethyl-(7-azaindol-2-yl)carboxamide; this amide is reduced with lithium aluminum hydride to produce 2-dimethylaminomethyl-7-azaindole; and finally this product is subjected to metathetical replacement with cyanide ion to yield the desired 2-cyanomethyl-7-azaindole.

Intermediate cyanoalkyl-7-azaindole of Formulas II, IIa, IIb and IIc bearing substituents in one, two or three of the 4-, 5- and 6-positions, are obtained either from the generally known corresponding 7-azaindoles or the appropriate 4-, 5- or 6-substituted 3-methyl-2-nitropyridines according to the processes described above. The 7-azaindoles used as starting materials in my invention are generally known in the art and are prepared by known procedures. Among these procedures are: Madelung ring closure of the corresponding 2-formamido-3-methylpyridines: amination of the appropriate 2-chloro-3-(2-chloroethyl)pyridine; Fischer cyclization of the corresponding pyridylhydrazones; and the procedure of Lorenz, Tullar, Koelsch and Archer, J. Org. Chem. 30, 2531 (1965), for cyclization of the appropriate N-(3-methyl-2-pyridyl)-N'-methyl-N'-phenylformamidine. The use of such substituted 7-azaindoles or substituted 3-methyl-2-nitropyridines does not affect the operability of the process of my invention. The preferred substituents, represented by the term Q in Formula I above, are lower-alkyl, e.g., methyl, ethyl, isopropyl, or any other analogous lower-alkyl radical; lower-alkoxy, e.g., methoxy, ethoxy, butoxy, or any other analogous lower-alkoxy radical; or lower-alkylmercapto, e.g., methylmercapto, butylmercapto, or any other analogous lower-alkylmercapto radical.

The compounds of the invention in free base form are converted to the acid-addition salt form by interaction of the base with an acid. In like manner, the free bases can be regenerated from the acid-addition salt form in the conventional manner, that is, by treating the salts with strong aqueous bases. for example alkali metal hydroxides, alkali metal carbonates and alkali metal bicarbonates. The bases thus regenerated can then be interacted with the same or a different acid to give back the same or a different acid-addition salt. Thus the novel bases and all of their acid-addition salts are readily interconvertible.

It will thus be appreciated that Formulas Ia, Ib and Ic not only represent the structural configurations of the bases of my invention but each is also representative of the respective structural entity which is common to all of my respective compounds, whether in the form of the free bases or in the form of the acid-addition salts of the bases. I have found that by virtue of this common structural entity, the bases and their acid-addition salts have inherent pharmacodynamic activity of the type described hereinabove. This inherent pharmacodynamic activity can be used for pharmaceutical purposes by employing either the free bases or the acid-addition salts formed with pharmaceutically-acceptable acids, that is, acids whose anions are innocuous to the animal organism in effective doses of the salts so that beneficial properties inherent in the common structural entity represented by the free bases are not vitiated by side-effects ascribable to the anions.

In utilizing this pharmacodynamic activity of the salts of the invention, I prefer of course to use pharmaceutically-acceptable salts. Although water-insolubility, high toxicity, or lack of crystalline character may make some particular salt species unsuitable or less desirable for use as such in a given pharmaceutical application, the water-insoluble or toxic salts can be converted to the corresponding pharmaceutically-acceptable bases by decomposition of the salt with aqueous base as described above, or alternatively they can be converted to any desired pharmaceutically-acceptable acid-addition salt by double decomposition reactions involving the anion, for example by ion-exchange procedures.

Moreover, apart from their usefulness in pharmaceutical applications, my salts are useful as characterizing or identifying derivatives of the free bases or in isolation or purification procedures. Like all of the acid-addition salts, such characterizing or purification salt derivatives can, if desired, be used to regenerate the pharmaceutically-acceptable free bases by reaction of the salts with aqueous base, or alternatively they can be converted to pharmaceutically-acceptable acid-addition salts by, for example, ion exchange procedures.

It will be appreciated from the foregoing that all of the acid-addition salts of my new bases are useful and valuable compounds, regardless of considerations of solubility, toxicity, physical form, and the like, and are accordingly within the purview of the instant invention.

The novel feature of the compounds of the invention therefore resides in the concept of the bases and cationic forms of the new (2-imidazolin-2-yl)-lower-alkyl-7-azaindoles, and not in any particular acid anion associated with the salt forms of the compounds; rather, the acid anions, which can be associated in the salt forms, are in themselves neither novel nor critical and therefore can be any acid anion or acid-like substance capable of salt formation with bases. In fact, in aqueous solutions the base form or water-soluble acid-addition salt form of the compounds of the invention both possess a common protonated cation or ammonium ion.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

The chemical structures of the compounds of the invention are established by their mode of synthesis and are corroborated by the correspondence between calculated values for the elements and values found by chemical analysis.

The following examples will further illustrate specific embodiments of the invention.

EXAMPLE 1

1-[2(2-imidazolin-2-yl)ethyl]-7-azaindole (a) To a solution of 31 g. (0.26 mole) of 7-azaindole and about 1 g. of powdered potassium hydroxide in 125 ml. of benzene was added 17 ml. of acrylonitrile. The mixture was stirred for three hours, diluted with ethyl acetate, washed with water, and the organic layer dried and taken to dryness giving 36.1 g. of a yellow oil which was distilled in vacuo. The fraction boiling at 101–102° C./0.08 mm. was collected giving 33.1 g. of 1-(2-cyanoethyl)-7-azaindole. The free base, dissolved in dry ether, was treated with hydrogen chloride in conventional manner giving 1-(2-cyanoethyl)-7-azaindole in the form of its hydrochloride salt, M.P. 151.0–152.0° C. (corr.).

(b) To a solution of 8.3 g. (0.048 mole) of 1-(2-cyanoethyl)-7-azaindole hydrochloride in 400 ml. of methylene dichloride was added 1.8 g. (0.039 mole) of ethyl alcohol. The solution was saturated with anhydrous hydrochloric acid and refrigerated for four hours. The solid that had formed was collected and dried in vacuo giving 11.5 g. of ethyl $\beta$-(7-azaindol-1-yl)propionimidate dihydrochloride melting at 133–136.5° C. with decomposition. Ten grams (0.035 mole) of the ethyl $\beta$-(7-azaindol-1-yl)propionimidate dihydrochloride was added in portions to a stirred solution of 2.3 g. (0.038 mole) of ethylenediamine in 75 ml. of ethyl alcohol. The mixture was refluxed for six hours, set aside at 25° C. for sixteen hours, and then filtered. The filtrate was evaporated under reduced pressure and the solid residue recrystallized from isopropyl alcohol/ethyl acetate to give 1-[2-(2 - imidazolin -2-yl)ethyl]-7-azaindole monohydrochloride melting at 180.0–183.0° C. (corr.).

EXAMPLE 2

3-(2-imidazolin-2-ylmethyl)-7-azaindole (a) A warmed, stirred mixture of 5.25 g. (0.03 mole) of 3-dimethylaminomethyl-7-azaindole and 7.38 g. (0.15 mole) of sodium cyanide in 750 ml. of water was treated dropwise with 12.5 ml. (0.15 mole) of concentrated hydrochloric acid. The mixture was warmed for six hours, cooled, and the product which had separated was collected, dried, and recrystallized from benzene giving 3-cyanomethyl-7-azaindole melting at 141.4–142.6° C. (corr.).

(b) To a mixture of 50.0 g. (0.32 mole) of 3-cyanomethyl-7-azaindole and 23.0 g. (0.38 mole) of ethylenediamine was added in small portions 5.0 ml. of carbon disulfide. The mixture was immersed in an oil bath at 140° C., the temperature increased to 165° C. for ten minutes, and then held at 140° C. for fifty minutes. The hot melt was poured into 500 ml. of ethyl acetate and the resultant mass triturated. The solid was collected and recrystallized from pyridine with charcoaling to give 3-(2-imidazolin-2-ylmethyl)-7-azaindole melting at 183–187° C. (uncorr.). The free base, dissolved in ethyl alcohol, was treated with p-toluenesulfonic acid monohydrate to obtain 3-(2-imidazolin-2-ylmethyl)-7-azaindole p-toluenesulfonate which melted at 197.8–200.0° C. (corr.) after recrystallization from ethyl alcohol.

EXAMPLE 3

1-(2-imidazolin-2-ylmethyl)-7-azaindole (a) To a stirred solution of 5.9 g. (0.05 mole) of 7-azaindole in 50 ml. of hot dimethylformamide was added 1.2 g. (0.05 mole) of sodium hydride in mineral oil. When hydrogen evolution had ceased, a solution of 3.77 g. (0.05 mole) of chloroacetonitrile in 5 ml. of dimethylformamide was added over a period of fifteen minutes. The reaction was stirred at room temperature for two hours, and taken to dryness in vacuo. The residue was suspended in water and ether, extracted with a benzene/ethyl acetate mixture, and the combined organic extracts were taken to dryness. Recrystallization of the residue from ether yielded 1-cyanomethyl-7-azaindole, M.P. 81.8–83.8° C. (corr.).

(b) Following the procedure of Example 2(b) hereinabove but substituting 1-cyanomethyl-7-azaindole for 3-cyanomethyl-7-azaindole, there was obtained 1-(2-imidazolin-2-ylmethyl)-7-azaindole. Treatment of the free base with anhydrous hydrochloric acid in isopropyl alcohol, yielded 1-(2-imidazolin-2-ylmethyl) - 7 - azindole hydrochloride, M.P. 239–241° C. (uncorr.).

EXAMPLE 4

2-methyl-3-(2-imidazolin-2-ylmethyl)-7-azaindole (a) A mixture of 9.5 g. (0.05 mole) of 2-methyl-3-dimethylaminomethyl-7-azaindole and 11.2 g. (0.23 mole) of sodium cyanide in 11.3 ml. of water was treated dropwise with stirring and warming with 18.9 ml. of concentrated hydrochloric acid. The mixture was warmed for six hours, cooled, and the pale yellow solid which had separated was collected, dried and recrystallized from ethanol giving 11.1 g. of 2-methyl-3-cyanomethyl-7-azaindole, M.P. 200.8–204.2° C. (corr.).

(b) Following the procedure of Example 2(b) hereabove, but substituting 2-methyl-3-cyanomethyl-7-azaindole in equimolar quantity for 3-cyanomethyl-7- azaindole, there was obtained 2-methyl -3-(2-imidazolin-2-ylmethyl)-7-azaindole p-toluenesulfonate, M.P. 298–305° C. (dec.) (uncorr.).

EXAMPLE 5

1-methyl-3-(2-imidazolin-2-ylmethyl)-7-azaindole (a) A suspension of 5.1 g. (0.21 mole) of sodium hydride in 500 ml. of dimethylformamide was treated with 31.4 g. (0.02 mole) of 3-cyanomethyl-7-azaindole. When hydrogen evolution had ceased, the mixture was treated with 12.4 ml. (0.2 mole) of methyl iodide dissolved in a small amount of dimethylformamide over a period of about ten minutes. The reaction mixture was allowed to stand at room temperature for one week, diluted with 300 ml. of water and extracted with ether. The combined extracts were taken to dryness and the residue recrystallized from hexane giving 1-methyl-3-cyanomethyl-7-azaindole, M.P. 81–82.5° C. (uncorr.).

(b) When 1-methyl-3-cyanomethyl-7-azaindole is caused to react with ethylene diamine in the presence of a small amount of carbon disulfide according to the procedure of Example 2(b) hereinbefore described, there is obtained 1-methyl-3-(2-imidazolin-2-ylmethyl)-7-azaindole.

EXAMPLE 6

1-benzyl-3-(2-imidazolin-2-ylmethyl)-7-azaindole (a) The manipulative procedure described in Example 5(a) above was followed in causing 31.4 g. (0.20 mole) of 3-cyanomethyl-7-azaindole, 5.1 g. (0.21 mole) of sodium hydride and 25.3 g. (0.20 mole) of benzyl chloride to react in 500 ml. of dimethylformamide. The crude product was purified by chromatographing in ether on a column of 400 g. of activated magnesium silicate. The first liter of eluate was discarded, and the second liter was taken to dryness, and the residue recrystallized twice from benzene/hexane giving 1-benzyl-3-cyanomethyl-7-azaindole, M.P. 74.5–76° C. (uncorr.).

By replacing the benzyl chloride in the foregoing preparation by a molar equivalent amount of 4-methylbenzyl chloride, 3-methoxybenzyl chloride, 3,4,5-trimethoxybenzyl chloride, 3-bromo-4-ethoxybenzyl chloride or 4-ethoxymercaptobenzyl chloride there can be obtained, respectively, 1-(4-methylbenzyl) - 3 - cyanomethyl-7-azaindole, 1-(3-methoxybenzyl)-3-cyanomethyl-7-azaindole, 1-(3,4,5-trimethoxybenzyl)-3-cyanomethyl-7-azaindole, 1-(3-bromo-4-ethoxybenzyl)-3-cyanomethyl-7-azaindole, or 1-(4-ethoxymercaptobenzyl)-3-cyano-methyl-7-azaindole.

(b) Employing the procedure of Example 2(b) described above, but substituting 1-benzyl-3-cyanomethyl- 7-azaindole for 3-cyanomethyl-7-azaindole, there was obtained 1-benzyl-3-(2-imidazolin-2-ylmethyl)-7-azaindole. The free base, dissolved in ethyl alcohol, was treated with p-toluenesulfonic acid monohydrate to obtain 1-benzyl-3-(2-imidazolin-2-ylmethyl)-7-azaindole di-p-toluenesulfonate, M.P. 155–157° C. (uncorr.).

Similarly, 1-(4-methylbenzyl - 3 -cyanomethyl-7-azaindole, 1-(3-methoxybenzyl)-3-cyanomethyl-7-azaindole, 1-(3,4,5 - trimethoxybenzyl)-3-cyanomethyl-7-azaindole, 1-(3-bromo-4-ethoxybenzyl)-3-cyanomethyl-7-azaindole or 1-(4 - ethoxymercaptobenzyl)-3-cyanomethyl-7-azaindole can be converted, respectively, to 1-(4-methylbenzyl)-3-(2-imidazolin-2-ylmethyl)-7-azaindole, 1-(3-methoxybenzyl)-3-(2 - imidazolin-2-ylmethyl)-7-azaindole, 1-(3,4,5-trimethoxybenzyl)-3-(2 - imidazolin-2-ylmethyl)-7-azaindole, 1-(3 - bromo-4-ethoxybenyl)-3-(2-imidazolin-2-yl-methyl)-7-azaindole or 1-(4-ethoxymercaptobenzyl)-3-(2-imidazolin-2-ylmethyl)-7-azaindole.

EXAMPLE 7

3-[2-(2-imidazolin-2-yl)ethyl]-7-azaindole (a) A solution of 42.2 g. (0.24 mole) of 3-dimethylaminomethyl-7-azaindole, 33.6 g. (0.24 mole) of hexamethylenetetramine, and 190 ml. of 66% propionic acid was filtered and added, over a period of one hour, to a refluxing solution of 3.6 g. (0.24 mole) of hexamethylenetetramine in 120 ml. of 66% propionic acid. The combined mixture was heated under reflux for two hours, diluted with 750 ml. of water, cooled, and after standing for three hours, the solid which had separated was collected, washed with water, and dried to give 7-azaindole-3-carboxaldehyde, M.P. 214–217° C. (uncorr.).

The latter (0.118 mole) was dissolved in 600 ml of ethanol along with 11.0 g. (0.13 mole) of cyanoacetic acid and 13.7 g. (0.16 mole) of piperidine and refluxed for forty minutes. The reaction mixture was taken to dryness, the residue dissolved in aqueous sodium bicarbonate-sodium hydroxide solution, extracted with ether, and acidified to pH 6 with acetic acid. The solid which separated was collected, washed with water, and dried to yield β-(7-azaindol-3-yl)-α-cyanoacrylic acid, M.P. 250–255° C. (uncorr.).

The latter (0.105 mole) was dissolved in 300 ml. of a eutectic mixture of diphenyl and diphenyl oxide. One gram of copper chromite was added, and the mixture was heated under reflux for twenty minutes, filtered, cooled, and extracted with 1:3 hydrochloric acid. The acid extracts were washed with ether, charcoaled, filtered, basified with aqueous sodium hydroxide, and the solid which separated was collected and dried giving 10.2 g. of crude product, M.P. 225–240° C. (uncorr.). Recrystallization from acetonitrile afforded β-(7-azaindol-3-yl)-acrylonitrile, M.P. 246–257° C. Further recrystallization from acetic acid/water gave material having M.P. 259° C. (uncorr.).

The latter (0.011 mole) was suspended in ethanol and reduced with hydrogen over a palladium-on-charcoal catalyst, reduction being complete in about twenty minutes. The reaction mixture was filtered, the solvent removed in vacuo, and the residue recrystallized twice from benzene giving 3-(2-cyanoethyl)-7-azaindole, M.P. 170.0–172.0° C. (corr.).

(b) Following the procedure of Example 2(b) hereinbefore described, but substituting 3-(2-cyanoethyl)-7-azaindole for 3-cyanomethyl-7-azaindole, there is obtained 3-[2-(2-imidazolin-2-yl)ethyl]-7-azaindole.

EXAMPLE 8

1-(2-imidazolin-2-ylmethyl)-3-[2-(2-imidazolin-2-yl)ethyl]-7-azaindole (a) A solution of 29.0 g. (0.17 mole) of 3-(2-cyanoethyl)-7-azaindole in 175 ml. of dimethylformamide was treated with 7.7 g. (0.32 mole) of sodium hydride in mineral oil. When hydrogen evolution had ceased, the mixture was treated with chloroacetonitrile and allowed to stand for two days. The mixture was carefully decomposed with water, taken to dryness in vacuo, and the resulting oil suspended in water and extracted with ether. The organic extracts were taken to dryness and the residue extracted with hot cyclohexane. The residue from the cyclohexane extraction was dissolved in ether, washed once with aqueous sodium carbonate, once with water, and the solution evaporated to dryness. The residue, on recrystallization once from benzene/ethanol and once from ethanol alone, afforded 1-cyanomethyl-3-(2-cyanoethyl)-7-azaindole, M.P. 106.5–108.0° C. (uncorr.).

(b) When one-half the molar quantity of 1-cyanomethyl-3-(2-cyanoethyl)-7-azaindole is substituted for 3-cyanomethyl-7-azaindole in reaction with ethylenediamine according to the procedure followed in Example 2(b) hereinabove, there is obtained 1-(2-imidazolin-2-ylmethyl)-3-[2-(2-imidazolin-2-yl)-ethyl]-7-azaindole.

EXAMPLE 9

2-(2-imidazolin-2-ylmethyl)-7-azaindole

Following the procedure described in Example 1(b) hereinabove but substituting 2-cyanomethyl-7-azaindole hydrochloric in molar equivalent amount for the 1-(2-cyanoethyl)-7-azaindole hydrochloride used in that example, there is obtained 2-(2-imidazolin-2-ylmethyl)-7-azaindole.

The required intermediate, 2-cyanomethyl-7-azaindole, is prepared starting with 3-methyl-2-nitro pyridine which is reacted with ethyl oxalate to give ethyl (2-nitro-3-pyridyl)-pyruvate. After hydrolysis of the ester, ring closure is accomplished by reduction with zinc dust and acetic acid to obtain 7-azaindole2-2carboxylic acid. Treatment of this product with thionyl chloride followed by reaction of the resultant acid chloride with dimethylamine gives N,N-dimethyl-7-azaindole-2-carboxamide. Reduction with lithium aluminum hydride produces 2-dimethylaminomethyl-7-azaindole. Substituting this compound in molar equivalent amount for the 3-dimethylaminomethyl-7-azaindole and following the procedure of Example 2(a), there is obtained 2-cyanomethyl-7-azaindol. By treating the free base dissolved in ethyl alcohol with anhydrous hydrochloric acid, 2-cyanomethyl-7-azaindole hydrochloride is obtained.

EXAMPLE 10

3-(4-methyl-2-imidazolin-2-ylmethyl)-7-azaindole

Substituting 1,2-diaminopropane in molar equivalent quantity for ethylenediamine in the procedure described in Example 2(b) hereinabove, there was obtained 3-(4-methyl-2-imidazolin-2-ylmethyl)-7 - azaindole. The base was treated with an acetone solution of p-toluenesulfonic acid monohydrate to give the corresponding p-toluenesulfonate salt, M.P. 181.0–182.5° C. (uncorr.).

EXAMPLE 11

3-(4,4-dimethyl-2-imidazolin-2-ylmethyl)-7-azaindole

Following the procedure of Example 2(b) hereinabove, but substituting 1,2-diamino-2-methylpropane in equimolar quantity for ethylenediamine, there was obtained 3-(4,4-dimethyl-2-imidazolin-2-ylmethyl) - 7 - azaindole. Treatment of the base with an acetone solution of p-toluenesulfonic acid monohydrate yielded 3-(4,4-dimethyl-2-imidazolin-2-ylmethyl) - 7 - azaindole p-toluenesulfonate, M.P. 189.5–191.0° C. (uncorr.).

EXAMPLE 12

1-phenyl-3-(2-imidazolin-2-ylmethyl)-4-methyl-7-azaindole (a) By following the procedure of Example 4(a) hereinabove in treating 13.3 g. (0.05 mole) of 1-phenyl-3-dimethylamonomethyl-4-methyl-7-azaindole and 11.2 g. (0.23 mole) of sodium cyanide in 11.3 ml. of water with 18.9 ml. of concentrated hydrochloric acid, there is obtained 1-phenyl-3-cyanomethyl-4-methyl-7-azaindole.

(b) When 7.1 g. (0.03 mole) of 1-phenyl-3-cyanomethyl-4-methyl-7-azaindole is caused to react with 2.0 g. (0.033 mole) of ethylenediamine in the presence of 0.5 ml. of carbon disulfide according to the procedure of Example 2(b), there is obtained 1-phenyl-3-(2-imidazolin-2-ylmethyl)-4-methyl-7-azaindole.

EXAMPLE 13

1-(2-imidazolin-2-ylmethyl)-2,3-diphenyl-7-azaindole (a) Employing the procedure of Example 8(a) hereinabove, 10.8 g. (0.04 mole) of 2,3-diphenyl-7-azaindole is first treated with 1.8 g. (0.075 mole) of sodium hydride and then reacted with 3.1 g. (0.04 mole) of chloroacetonitrile to obtain 1-cyanomethyl-2,3-diphenyl-7-azaindole.

Similarly, 2,3-di(p-anisyl)-7-azaindole reacts with chloroacetonitrile to yield 1-cyanomethyl-2,3-di(p-anisyl)-7-azaindole.

(b) The reaction of 9.3 g. (0.03 mole) of 1-cyanomethyl-2,3-diphenyl-7-azaindole with 2.2 g. (0.035 mole) of ethylenediamine in the presence of 0.5 ml. of carbon disulfide according to the procedure of Example 2(b), yields 1-(2-imidazolin-2-ylmethyl) - 2,3-diphenyl-7-azaindole.

Similarly, 1-cyanomethyl-2,3-di(p-anisyl)-7 - azaindole reacts with ethylenediamine to yield 1-(2-imidazolin-2-ylmethyl)-2,3-di(p-anisyl)-7-azaindole.

EXAMPLE 14

1-[2-(1-ethyl-2-imidazolin-2-yl)ethyl]-7-azaindole

A mixture of 17.1 g. (0.1 mole) of 1-(2-cyanoethyl)-7-azaindole and 10.5 g. (0.12 mole) of N-ethyl-ethylenediamine when treated with 2.0 ml. of carbon disulfide according to the procedure described in Example 2(b) above yields 1-[2-(1-ethyl-2-imidazolin-2-yl)ethyl]-7-azaindole.

EXAMPLE 15

2-methyl-3-(1-isopropyl-4,5-dimethyl-2-imidazolin-2-ylmethyl)-7-azaindole

When 11.1 g. (0.065 mole) of 2-methyl-3-cyanomethyl-7-azaindole is caused to react with 8.4 g. (0.07 mole) of 2-amino-3-isopropylaminobutane in the presence of 1.0 ml. of carbon disulfide, according to the procedure of Example 2(b) above, there is obtained 2-methyl-3-(1-isopropyl-4,5-dimethyl-2-imidazolin-2-ylmethyl)-7-azaindole.

By application of the procedure of either Example 1(b) or of Example 2(b) described hereinabove, by reacting the appropriate cyanoalkyl-7-azaindole (prepared according to the procedure of Example 1(a), Example 2(a) or Example 6(a) hereinabove) with the appropriate diamine of Formula III, there can be obtained:

1 - [3 - (2 - imidazolin - 2 - yl)propyl] - 3 - [2 - (2-imidazolin - 2 - yl)ethyl] - 7 - azaindole from 1 - (3 - cyanopropyl)-3-(2-cyanoethyl)-7-azaindole and ethylenediamine;

3-[2-(2-imidazolin-2-yl)propyl]-7-azaindole from 3-(2-cyanopropyl)-7-azaindole and ethylenediamine;

1 - phenyl - 3 - (2 - imidazolin - 2 - ylmethyl) - 4 - methyl-7-azaindole from 1-phenyl-3-cyanomethyl-4-methyl-7-azaindole and ethylenediamine;

1 - (3 - chlorobenzyl) - 3 - (4,4,5,5 - tetramethyl - 2-imidazolin - 2 - ylmethyl) - 4 - methyl - 6 - methoxy - 7-azaindole from 1-(3-chlorobenzyl)-3-cyanomethyl-4-methyl-6-methoxy-7-azaindole and 2,3-dimethyl-2,3-diaminobutane;

3 - (1,4,4,5,5 - pentamethyl - 2 - imidazolin - 2 - ylmethyl) 17-azaindole from 3-cyanomethyl-7-azaindole and N,2,3-trimethyl-2,3-diaminobutane;

2 - [2 - (4 - methyl - 2 - imidazolin - 2 - yl)ethyl] - 7-azaindole from 2-(2-cyanoethyl)-7-azaindole and 1,2-diaminopropane;

1 - isopropyl - 3 - [2 - (2 - imidazolin - 2 - yl)ethyl] - 6-butylmercapto-7-azaindole from 1-isopropyl-3-(2-cyanoethyl)-6-butylmercapto-7-azaindole and ethylenediamine;

3 - (2 - imidazolin - 2 - ylmethyl) - 4 - methylmercapto-7-azaindole from 3-cyanomethyl-4-methylmercapto-7-azaindole and ethylenediamine;

3 - (2 - imidazolin - 2 - ylmethyl) - 4,5,6 - trimethyl - 7-azaindole from 3-cyanomethyl-4,5,6-trimethyl-7-azaindole and ethylenediamine.

I claim:
1. A compound of the formula:

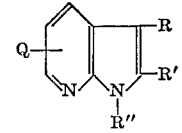

wherein one or two of R, R′ or R″ is (2-imidazolin-2-yl)-lower-alkyl and the other of R, R′ or R″ when not (2-imidazolin-2-yl)-lower-alkyl, is hydrogen, lower-alkyl, phenyl or phenyl-lower-alkyl; wherein the imidazolinyl group is unsubstituted or substituted by from one to five lower-alkyl groups, and phenyl, both occurrences, is unsubstituted or substituted by from one to three groups selected from the group consisting of lower-alkyl, lower-alkoxy, halogen, lower-alkylmercapto or trifluoromethyl; and Q stands for hydrogen, one substituent attached to a ring carbon selected from the group consisting of lower-alkyl, lower-alkoxy, and lower-alkylmercapto, two substituents attached to ring carbon selected from lower-alkyl and lower-alkoxy, or three lower-alkyl substituents attached to ring carbon.

2. 1 - R″ - 2 - R′ - 3 - [(2 - imidazolin - 2 - yl) - lower-alkyl]-7-azaindole, according to claim 1, wherein R is (2-imidazolin-2-yl)-lower-alkyl and Q is hydrogen.

3. 1 - R″ - 2 - R′ - 3 - (2 - imidazolin - 2 - ylmethyl) - 7-azaindole, according to claim 2, wherein (2-imidazolin-2-yl)-lower-alkyl is (2-imidazolin-2-ylmethyl).

4. 3-(2-imidazolin-2-ylmethyl)-7-azaindole, according to claim 3, wherein R′ and R″ are hydrogen.

5. 1 - lower - alkyl - 2 - R′ - 3 - (2 - imidazolin - 2 - ylmethyl)-7-azaindole, according to claim 3, wherein R″ is lower-alkyl.

6. 1 - methyl - 2 - R′ - 3 - (2 - imidazolin - 2 - ylmethyl)-7-azaindole, according to claim 5, wherein lower-alkyl is methyl.

7. 1 - methyl - 3 - (2 - imidazolin - 2 - ylmethyl) - 7-azaindole, according to claim 6, wherein R′ is hydrogen.

8. 1 - R″ - 2 - lower - alkyl - 3 - (2 - imidazolin - 2 - ylmethyl)-7-azaindole, according to claim 3, wherein R′ is lower-alkyl.

9. 1 - R″ - 2 - methyl - 3 - (2 - imidazolin - 2 - ylmethyl)-7-azaindole, according to claim 8, wherein lower-alkyl is methyl.

10. 2 - methyl - 3 - (2 - imidazolin - 2 - ylmethyl) - 7-azaindole, according to claim 9, wherein R″ is hydrogen.

11. 1 - (phenyl - lower - alkyl) - 2 - R′ - 3 - (2 - imidazolin-2-ylmethyl)-7-azaindole, according to claim 3, wherein R″ is phenyl-lower-alkyl.

12. 1 - benzyl - 2 - R′ - 3 - (2 - imidazolin - 2 - ylmethyl)-7-azaindole, according to claim 11, wherein phenyl-lower-alkyl is benzyl.

13. 1 - benzyl - 3 - (2 - imidazolin - 2 - ylmethyl) - 7-azaindole, according to claim 12, wherein R′ is hydrogen.

14. 1 - R″ - 2 - R′ - 3 - [2 - (2 - imidazolin - 2 - yl)ethyl]-7-azaindole, according to claim 2, wherein (2-imidazolin-2-yl)-lower-alkyl is 2-(2-imidazolin-2-yl)ethyl.

15. 3 - [2 - (2 - imidazolin - 2 - yl)ethyl] - 7 - azaindole, according to claim 14, wherein R′ and R″ are hydrogen.

16. 1 - [(2 - imidazolin - 2 - yl) - lower - alkyl] - 2 - R′-3-R-7-azaindole, according to claim 1, wherein R″ is (2-imidazolin-2-yl)-lower-alkyl.

17. 1 - (2 - imidazolin - 2 - ylmethyl) - 2 - R′ - 3 - R - 7-azaindole, according to claim 16, wherein (2-imidazolin-2-yl)-lower-alkyl is (2-imidazolin-2-ylmethyl).

18. 1 - (2 - imidazolin - 2 - ylmethyl) - 7 - azaindole, according to claim 17, wherein R and R' are hydrogen.

19. 1 - [2 - (2 - imidazolin - 2 - yl)ethyl] - 2 - R' - 3 - R-7-azaindole, according to claim 16, wherein (2-imidazolin-2-yl)-lower-alkyl is 2-(2-imidazolin-2-yl)ethyl.

20. 1 - [2 - (2 - imidazolin - 2 - yl)ethyl] - 7 - azaindole, according to claim 19, wherein R and R' are hydrogen.

21. 1 - R" - 2 - [(2 - imidazolin - 2 - yl) - lower - alkyl]-3-R-7-azaindole, according to claim 1, wherein R' is (2-imidazolin-2-yl)-lower-alkyl.

22. 1 - [(2 - imidazolin - 2 - yl) - lower - alkyl] - 2 - R'-3-[(2-imidazolin-2-yl)-lower-alkyl]-7-azaindole, according to claim 1, wherein R and R" are (2-imidazolin-2-yl)-lower-alkyl.

23. 3 - (4 - methyl - 2 - imidazolin - 2 - ylmethyl) - 7-azaindole, according to claim 1, wherein R', R" and Q are hydrogen and R is 4-methyl-2-imidazolin-2-ylmethyl.

24. 3 - (4,4 - dimethyl - 2 - imidazolin - 2 -ylmethyl) - 7-azaindole, according to claim 1, wherein R', R" and Q are hydrogen and R is 4,4-dimethyl-2-imidazolin-2-ylmethyl.

References Cited

UNITED STATES PATENTS 3,320,268   5/1967   Shen et al. _____ 260—296

OTHER REFERENCES

Hofmann, Imidazole and Derivatives, Part I, Interscience, pp. 213–220 (1953).

HENRY R. JILES, Primary Examiner

A. L. ROTMAN, Assistant Examiner

U.S. Cl. X.R.

260—294.8, 294.9, 295; 424—263

FO-1050
(5/69)

UNITED STATES PATENT OFFICE
CERTIFICATE OF CORRECTION

Patent No. 3,524,860          Dated August 18, 1970

Inventor(s) Noel F. Albertson

It is certified that error appears in the above-identified patent and that said Letters Patent are hereby corrected as shown below:

Column 9, line 26, "3.6 g." should read --33.6 g.--.

Column 10, line 25, "hydrochloric" should read --hydrochloride--; line 34, "7-azaindole2-2carboxylic" should read --7-azaindole-2-carboxylic--; line 74, "dimethylamonomethyl" should read --dimethylaminomethyl--.

Column 11, line 71, "methyl)17-" should read --methyl)-7- --.

Signed and sealed this 17th day of August 1971.

(SEAL)
Attest:

EDWARD M. FLETCHER, JR.
Attesting Officer

WILLIAM E. SCHUYLER, JR.
Commissioner of Patents